United States Patent
Ito et al.

(10) Patent No.: US 6,427,117 B1
(45) Date of Patent: Jul. 30, 2002

(54) NAVIGATION METHOD, NAVIGATION SYSTEM, AND INFORMATION COMMUNICATIONS APPARATUS USED IN THE NAVIGATION SYSTEM

(75) Inventors: Yasuo Ito; Naoki Gorai; Takashi Sugawara; Satoshi Kitano; Hiroyuki Yamakawa, all of Hokkaido (JP)

(73) Assignee: Kabushikikaisha Equos Research (JP)

( * ) Notice: Subject to any disclaimer, the term of this patent is extended or adjusted under 35 U.S.C. 154(b) by 0 days.

(21) Appl. No.: 09/551,403

(22) Filed: Apr. 17, 2000

(30) Foreign Application Priority Data

Jul. 14, 1999 (JP) ............................................ 11-199862
Dec. 27, 1999 (JP) ............................................ 11-369365

(51) Int. Cl.⁷ ............................ G06G 7/78; G08G 1/123
(52) U.S. Cl. ..................................... 701/209; 340/995
(58) Field of Search ............................. 701/23–26, 28, 701/200–204, 206–213, 215–224; 340/988–995

(56) References Cited

U.S. PATENT DOCUMENTS

| | | | | |
|---|---|---|---|---|
| 5,712,788 A | * | 1/1998 | Liaw et al. ................. | 701/209 |
| 5,911,773 A | * | 6/1999 | Mutsuga et al. ............ | 701/200 |
| 5,977,885 A | * | 11/1999 | Watanabe .................... | 340/995 |
| 6,101,443 A | * | 8/2000 | Kato et al. ................... | 701/210 |
| 6,202,024 B1 | * | 3/2001 | Yokoyama et al. ......... | 701/207 |
| 6,208,918 B1 | * | 3/2001 | Ando et al. .................. | 701/35 |

FOREIGN PATENT DOCUMENTS

| | | |
|---|---|---|
| JP | 10-103973 | 4/1998 |
| JP | 10-103993 | 4/1998 |
| JP | 11-38872 | 2/1999 |
| JP | 11-187456 | 7/1999 |

* cited by examiner

Primary Examiner—William A. Cuchlinski, Jr.
Assistant Examiner—Thu Nguyen
(74) Attorney, Agent, or Firm—Lorusso & Loud

(57) ABSTRACT

A navigation system includes a navigation center and at least one moving body. The navigation center of the navigation system comprises memory means for storing navigation information; updating means for constantly updating the navigation information stored in the memory means; route searching means for setting a route from a current position of the moving body to a destination on the basis of the newest navigation information updated by the updating means; dividing means for dividing the searched route into at least two portions; extracting means for extracting navigation data concerning at least a head portion of the divided route from the memory means; transmitting means for transmitting to the moving body the extracted navigation data; and control means. After transmitting the navigation data for the head portion to the moving body and before transmitting navigation data for a remaining route, the control means controls each of the route searching means, the dividing means, the extracting means and the transmitting means so that each means performs the respective processes. This arrangement enables a user of the moving body to be provided with route guidance which is conducted using the navigation data formed based on the newest navigation information that reflects various road conditions.

25 Claims, 7 Drawing Sheets

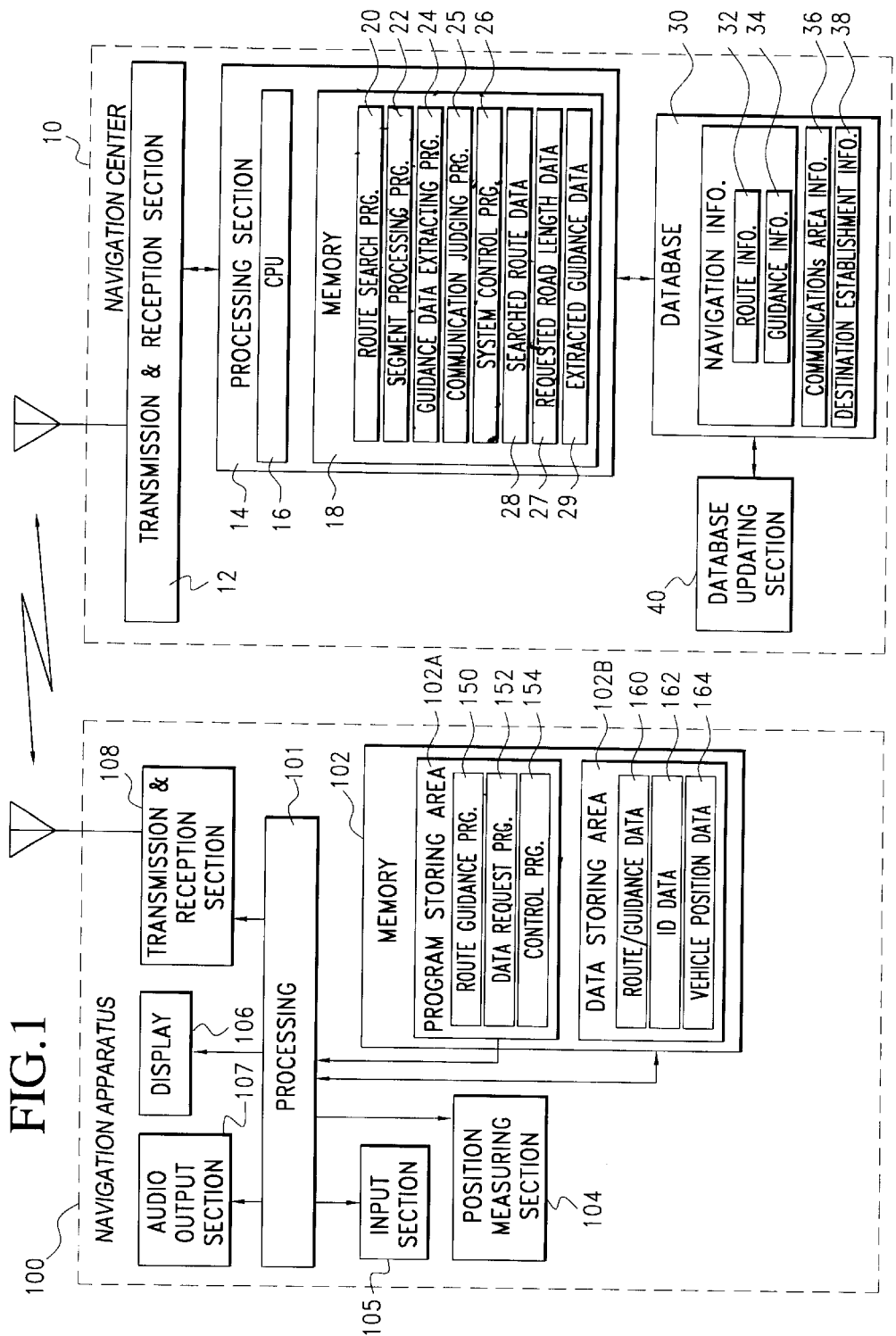

To Be Continued to Fig.2B

NAVIGATION METHOD, NAVIGATION SYSTEM, AND INFORMATION COMMUNICATIONS APPARATUS USED IN THE NAVIGATION SYSTEM

BACKGROUND OF THE INVENTION

1. Field of the Invention

The present invention relates to a navigation method in which navigation data concerning a route from a current position of a moving body to a destination is transmitted from a navigation center to the moving body, and then route guidance is carried out at the moving body using the received navigation data. The present invention also relates to a navigation system and an information communications apparatus used in the navigation system.

2. Description of the Prior Art

One example of a navigation system in which a moving body such as a vehicle is provided with route/guidance data (i.e., route data and guidance data concerning searched recommended route) from a navigation center is disclosed in Japanese Laid-Open Patent Publication No. HEI 10-19588. In such a navigation system, map images and recommended route data (or the best route data) required for guiding a vehicle to a destination is transmitted from a navigation center (navigation base) to the vehicle. In particular, data communications are carried out between a data transmission system in the navigation center and the navigation apparatus in the vehicle. In this regard, the data transmission system includes a database which stores data required for guiding the vehicle to a destination.

Further, based on a request received from the navigation apparatus mounted on the vehicle, the data transmission system reads out required data from the database and creates map images. Furthermore, the data transmission system carries out a route search to produce optimum route data. Data indicating the created map images and the optimum route is transmitted from the data transmission system to the navigation apparatus. Then, based on the map images and optimum route data transmitted from the data transmission system, the navigation apparatus on the vehicle displays predetermined images on a display.

Further, Japanese Laid-Open Patent Publication No. HEI 8-33437 discloses a vehicle-mounted route guidance apparatus in which a new recommended route is transmitted from a control center to the vehicle-mounted route guidance apparatus when the vehicle strays from the original recommended route due to a driving operation error. In this arrangement, the vehicle-mounted route guidance apparatus transmits departure point data and destination data to the control center when necessary, and the control center transmits recommended route data to the vehicle-mounted route guidance apparatus.

Further, the vehicle-mounted route guidance apparatus is constructed to carry out judgements as to whether or not t h e vehicle is traveling along the recommended route. In the case where a judgement that the vehicle has strayed from the recommended route is made, the vehicle-mounted route guidance apparatus reestablishes the departure point and then transmits data of such new departure point and the destination to the control center. In this case, the control center searches a new recommended route to the destination based on the newly established departure point data and the destination data received from the vehicle-mounted route guidance apparatus, and then transmits such searched recommended route data to the vehicle-mounted route guidance apparatus.

However, in the prior art navigation systems described above, when data related to the recommended route is transmitted to the vehicle, the navigation center transmits all the data in a single communication operation. Consequently, in the case where the road conditions of the recommended route along which the vehicle is scheduled to travel change (e.g., due to traffic congestion caused by an accident) after all the data related to the recommended route has been received by the vehicle but before reaching destination, it is no longer possible to continue (or carry out) smooth route guidance based on (or using) the received route/guidance data for the recommended route.

Further, in the conventional navigation system, all of the route/guidance data from the departure point to the destination are transmitted to the vehicle. Therefore, the amount of the data to be transmitted becomes huge, so that it takes a long time to transmit the data and further it is necessary for the vehicle to temporally store the huge amount of the transmitted data. Further, such a long data transmission time not only increases communication cost at the user but also lengthens the time required for processing the data. In particular, when the distance between the departure point and the destination is long, such increases in the communication time and communication cost cannot be ignored or disregarded.

Furthermore, in the case where the vehicle is traveling in tunnels or mountain areas where radio waves can not reach weak radio or wave areas such as building shadows, it becomes impossible to carry out communications satisfactorily between the navigation center and the vehicle. As a result, there is a probability that the vehicle will not be able to obtain the required route/guidance data.

SUMMARY OF THE INVENTION

In view of the problems of the prior art described above, it is an object of the present invention to provide a navigation method, a navigation system and an information communications apparatus used in the navigation system in which it is possible to transmit navigation data extracted from the newest navigation information to a moving body from a navigation center over the entire time the moving body is traveling to the destination (instead of carrying out such transmission only at the time of departure of the moving body toward the destination).

In is another object of the present invention to provide a highly reliable navigation method, a navigation system and an information communications apparatus used in the navigation system in which it is possible to reliably transmit navigation data from the navigation center to the moving body regardless of communication conditions.

In order to achieve the above objects, the present invention is directed to a navigation method in which navigation data concerning a route from a current position of a moving body to a destination is transmitted from a navigation center to the moving body, and then route guidance is carried out at the moving body using the navigation data received from the navigation center, the method comprising the steps of:

(a) updating navigation information which includes various information concerning routes, the navigation information being stored in memory means provided in the navigation center;

(b) conducting a route search for setting a route from a current position of the moving body to a destination on the basis of the newest navigation information updated in the updating step (a);

(c) dividing the route set at the route searching step (b) into at least two portions;

(d) extracting navigation data concerning at least a head portion of the route divided at the dividing step (c) from said memory means storing the newest navigation information updated in the updating step (a);

(e) transmitting the navigation data extracted at the extracting step (d) from the navigation center to the moving body;

(f) conducting a route search for setting a route from a current position of the moving body to the destination on the basis of the newest navigation information updated in the updating step (a) after transmitting the navigation data for the head portion to the moving body but before transmitting navigation data for a remaining portion of the route;

(g) dividing the route set at the route searching step (f) into at least two portions;

(h) extracting navigation data concerning at least a head portion of the route divided at the dividing step (g) from said memory means storing the newest navigation information updated at the updating step (a); and (i) transmitting the navigation data extracted at the extracting step (h) from the navigation center to the moving body.

According to the present invention described above, the determined route is divided into at least two portions, and then navigation data concerning the head portion of the divided route is transmitted from the navigation center to the moving body. Thus, as compared with the case where navigation data concerning all route from a departure point to a destination is transmitted to the moving body at one time, the amount of the navigation data to be transmitted to the moving body at one time is reduced. This allows the moving body to reliably receive the navigation data from the navigation center, and to smoothly begin route guidance.

Further, according to the present invention, the navigation information stored in the memory means is constantly updated. This allows the user of the moving body to obtain from the navigation center the navigation data extracted from the newest navigation information. Namely, according to the present invention, it becomes possible to provide the user with route guidance using the navigation data which is formed based on the newest navigation information that reflects various road conditions.

Furthermore, according to the present invention, a user of the moving body can always obtain from the navigation center navigation data extracted from the newest navigation information while the user is travelling on the route. Namely, this invention makes it possible to transmit navigation data extracted from the newest navigation information to the moving body from the navigation center over the entire time the moving body is traveling to the destination (instead of carrying out such transmission only at the time of departure of the moving body toward the destination).

In the present invention, it is preferred that the moving body transmits to the navigation center a request of the route search for setting the route from the current position of the moving body to the destination when reaching a predetermined request transmission point on the head portion whose navigation data has been received from the navigation center and along which the moving body is moving, and wherein the steps (f) to (i) are executed each time when the navigation center receives the request from the moving body.

According to the present invention described above, the moving body can obtain from the navigation center the navigation data extracted from the newest navigation information each time when the moving body reaches the predetermined request transmission points.

Further, in the present invention, it is also preferred that the navigation method further comprises the steps of:

making at least any one of a judgement as to whether or not the predetermined request transmission point on the head portion is positioned within a communications unable area or a poor communications area and a judgement as to whether or not a part of the head portion of the route where the moving body which has reached the request transmission point is expected to move until the moving body completely receives the navigation data for the head portion from the navigation center is partially or completely included in a communications unable area or a poor communications area; and changing the request transmission point to other point in a case where it is judged at the judging step that the predetermined request transmission point on the head portion is positioned within the communications unable area or the poor communications area, or in a case where it is judged at the judging step that the part of the head portion of the route where the moving body which has reached the request transmission point is expected to move until the moving body completely receives the navigation data for the head portion from the navigation center is partially or completely included in the communications unable area or the poor communications area; wherein the judging step and the changing step is executed before the step (e) or (i).

According to the present invention described above, in the case where, for example, it is judged that the predetermined request transmission point is positioned within a tunnel, the request transmission point is changed to other point. This allows the navigation center to reliably receive the request from the moving body. Further, in the case where, for example, it is judged that the part of the head portion of the route where the moving body which has reached the request transmission point is expected to move until the moving body completely receives all of the navigation data for the head portion from the navigation center is partially included in a tunnel, the request transmission point is also changed to other point. This allows the moving body to reliably receive the navigation data from the navigation center.

Furthermore, in the present invention, it is also preferred that the step of changing the request transmission point is performed by increasing road length of the head portion. In this case, it is preferred that the division of the route at each of the steps (c) and (g) is carried out by dividing the route into a plurality of segments, wherein each of the portions of the route divided at the dividing step (c) or (g) is established using one or more of the segments as a unit, and wherein the step of changing the request transmission point is performed by increasing the road length of the head portion by at least one segment.

Moreover, in the present invention, it is also preferred that the step of changing the request transmission point is performed by decreasing road length of the head portion. In this case, it is preferred that the division of the route at each of the steps (c) and (g) is carried out by dividing the route into a plurality of segments, wherein each of the portions of the route divided at the dividing step (c) or (g) is established using one or more of the segments as a unit, and wherein the step of changing the request transmission point is performed by decreasing the road length of the head by at least one segment.

According to the present invention described above, the moving body can transmit the request to the navigation center from a point which is neither a communications unable area nor a poor communications area. This allows the navigation center to reliably receive the request from the moving body. Further, the moving body can receive the navigation data from the navigation center at an area which is neither a communications unable area nor a poor communications area. This allows the moving body to reliably receive the navigation data from the navigation center.

In the present invention, it is preferred that the navigation center detects that the moving body reaches a predetermined route search point on the head portion whose navigation data has been received from the navigation center and along which the moving body is moving, the navigation center automatically executes the steps (f)–(i), whereby the moving body receives from the navigation center navigation data for a remaining portion of the route.

According to the present invention described above, the moving body can obtain from the navigation center navigation data for a remaining portion of the route without transmitting to the navigation center a request of transmission for navigation data, when the moving body reaches the predetermined route search point.

In the present invention, it is preferred that when traffic situation or road condition of an untraveled route of the head portion is changed while the moving body is on the route corresponding to the head portion whose navigation data has been received from the navigation center, the steps (f)–(i) are executed.

According to the present invention described above, even if, for example, traffic congestion has occurred due to a car accident anywhere on an untraveled portion of the route where the moving body has not yet traveled, it is possible for the moving body to obtain from the navigation center navigation data concerning a route that enables the moving body to avoid such a traffic congestion.

Another aspect of the present invention is directed to a navigation system in which navigation data concerning a route from a current position of a moving body to a destination is transmitted from a navigation center to the moving body, and then route guidance is carried out at the moving body using the navigation data received from the navigation center, the system comprising:
  memory means provided in the navigation center for storing navigation information which includes various information concerning routes;
  updating means provided in the navigation center for updating the navigation information stored in said memory means;
  route searching means provided in the navigation center for setting a route from a current position of the moving body to a destination on the basis of the newest navigation information stored in said memory means;
  dividing means provided in the navigation center for dividing the route set by said route searching means into at least two portions;
  extracting means provided in the navigation center for extracting navigation data concerning at least a head portion of the route divided by said dividing means from said memory means storing the newest navigation information updated by said updating means;
  transmitting means provided in the navigation center for transmitting from the navigation center to the moving body the navigation data extracted by said extracting means;
  control means provided in the navigation center for controlling each of said memory means, said updating means, said route searching means, said dividing means, said extracting means and said transmitting means; and
  receiving means provided in the moving body for receiving the navigation data transmitted from said transmitting means of the navigation center, wherein said control means controls said route searching means to set a route from a current position of the moving body to the destination on the basis of the newest navigation information stored in said memory means, controls said dividing means to divide the route set by said route searching means into at least two portions, controls said extracting means to extract navigation data concerning at least a head portion of the route divided by said dividing means from said memory means storing the newest navigation information updated by said updating means, and then controls said transmitting means to transmit from the navigation center to the moving body the navigation data extracted by said extracting means, after transmitting the navigation data for the head portion to the moving body but before transmitting the navigation data for the route which is newly set by said rout searching means.

In this invention, it is preferred that the moving body transmits to the navigation center a request of the route search for setting the route from the current position of the moving body to the destination when reaching a predetermined request transmission point on the head portion whose navigation data has been received from the navigation center and along which the moving body is moving, and wherein said control means controls each of said route searching means, said dividing means, said extracting means and said transmitting means so that each means performs the respective processes, each time when the navigation center receives the request from the moving body.

Further, in this invention, it is also preferred that the navigation system further comprises:
  judging means for making at least any one of a judgement as to whether or not the predetermined request transmission point on the head portion is positioned within a communications unable area or a poor communications area and a judgement as to whether or not a part of the head portion of the route where the moving body which has reached the request transmission point is expected to move until the moving body completely receives the navigation data for the head portion from the navigation center is partially or completely included in a communications unable area or a poor communications area; and
  changing means for changing the request transmission point to other point in a case where it is judged by said judging means that the predetermined request transmission point on the head portion is positioned within the communications unable area or the poor communications area, or in a case where it is judged by said judging means that the part of the head portion of the route where the moving body which has reached the request transmission point is expected to move until the moving body completely receives the navigation data for the head portion from the navigation center is partially or completely included in the communications unable area or the poor communications area; wherein the judgement by said judging means and the change of the request transmission point by said changing means are executed before the navigation data is transmitted to the moving body via said transmission means.

Furthermore, in this invention, it is also preferred that the division of the route by said dividing means is carried out by dividing the route into a plurality of segments, wherein each of the portions of the route divided by said dividing means is established using one or more of the segments as a unit.

Moreover, in this invention, it is also preferred that the change of the request transmission point by said changing means is performed by increasing road length of the head portion by at least one segment.

Still further, in this invention, it is also preferred that the change of the request transmission point by said changing means is performed by decreasing road length of the head portion by at least one segment.

Still further, in this invention, it is also preferred that each segment is established so as to have the same number of bits. In this case, the change of the request transmission point by said changing means may be performed by increasing road length of the head portion by at least one segment. Further, the change of the request transmission point by said changing means may also be performed by decreasing road length of the head portion by at least one segment.

Still further, in this invention, it is also preferred that each segment is established so as to have a substantially uniform road length. In this case, the change of the request transmission point by said changing means may be performed by increasing road length of the head portion by at least one segment. Further, the change of the request transmission point by said changing means may also be performed by decreasing road length of the head portion by at least one segment.

In this invention, it is preferred that when the navigation center detects that the moving body reaches a predetermined route search point on the head portion whose navigation data has been received from the navigation center and along which the moving body is moving, said control means controls each of said route searching means, said dividing means, said extracting means and said transmitting means so that each means performs the respective processes, whereby the moving body receives from the navigation center navigation data for a remaining portion of the route.

In this invention, it is preferred that when traffic situation or road condition of an untraveled route of the head portion is changed while the moving body is on the route corresponding to the head portion whose navigation data has been received from the navigation center, said control means controls the route searching means to set a route from a current position of the moving body to the destination on the basis of the newest navigation information stored in said memory means, controls said dividing means to divide the route set by the route searching means into at least two portions, controls said extracting means to extract the navigation data concerning at least the head portion of the route divided by said dividing means from said memory means storing the newest navigation information updated by said updating means, and then controls said transmitting means to transmit from said transmitting means of the navigation center to the moving body the navigation data extracted by said extracting means.

Other aspect of the present invention is directed to an information communications apparatus used in a navigation system in which navigation data concerning a route from a current position of a moving body to a destination is transmitted from a navigation center including the information communications apparatus to the moving body, and then route guidance is carried out at the moving body using the navigation data received from the navigation center, the apparatus comprising:

memory means for storing navigation information which includes various information concerning routes;

updating means for updating the navigation information stored in said memory means;

route searching means for setting a route from a current position of the moving body to a destination on the basis of the newest navigation information stored in said memory means;

dividing means for dividing the route set by said route search means into at least two portions;

extracting means for extracting navigation data concerning at least a head portion of the route divided by said dividing means from the memory means storing the newest navigation information updated by said updating means;

transmitting means for transmitting the navigation data extracted by said extracting means from the navigation center to the moving body; and control means for controlling each of said memory means, said updating means, said route searching means, said dividing means, said extracting means and said transmitting means, wherein said control means controls the route searching means to set a route from a current position of the moving body to the destination on the basis of the newest navigation information stored in said memory means, controls said dividing means to divide the route set by said route search means into at least two portions, controls said extracting means to extract navigation data concerning at least a head portion of the route divided by said dividing means from the newest navigation information, and then controls said transmitting means to transmit from the navigation center to the moving body the navigation data extracted by said extracting means, after transmitting the navigation data for the head portion to the moving body but before transmitting the navigation data for the route which is newly set by said rout searching means.

Yet other aspect of the present invention is directed to a navigation method in which navigation data and guidance data concerning a route from a navigation starting point to a navigation ending point are divided at a navigation center and then transmitted from the navigation center to a moving body so that route guidance is carried out at the moving body using the data, the method comprising a step of carrying out a route search based on newest data and then extracting guidance data before the navigation center transmits the divided route data and guidance data to the moving body.

Yet other aspect of the present invention is directed to a navigation method in which navigation data and guidance data concerning a route from a navigation starting point to a navigation ending point are divided at a navigation center and then transmitted from the navigation center to a moving body so that route guidance is carried out at the moving body using the data, the method comprising a step of carrying out a route search based on newest data and then extracting guidance data each time when the navigation center receives from the moving body a request for transmission of the route data and the guidance data.

Yet other aspect of the present invention is directed to a navigation method in which navigation data and guidance data concerning a route from a navigation starting point to a navigation ending point are divided at a navigation center and then transmitted from the navigation center to a moving body so that route guidance is carried out at the moving body using the data, the method comprising a step of carrying out a route search based on newest data and then extracting guidance data each time when the navigation center transmits the divided route data and guidance data to the moving body.

The above described and other objects, structures and advantages of the present invention will be apparent when the following description of the preferred embodiment will be considered in conjunction with the appended drawings.

BRIEF DESCRIPTION OF THE DRAWINGS

FIG. 1 is a block diagram which shows an over all structure of a navigation system according to the present invention;

DETAILED DESCRIPTION OF THE PREFERRED EMBODIMENTS

Figure 2A:
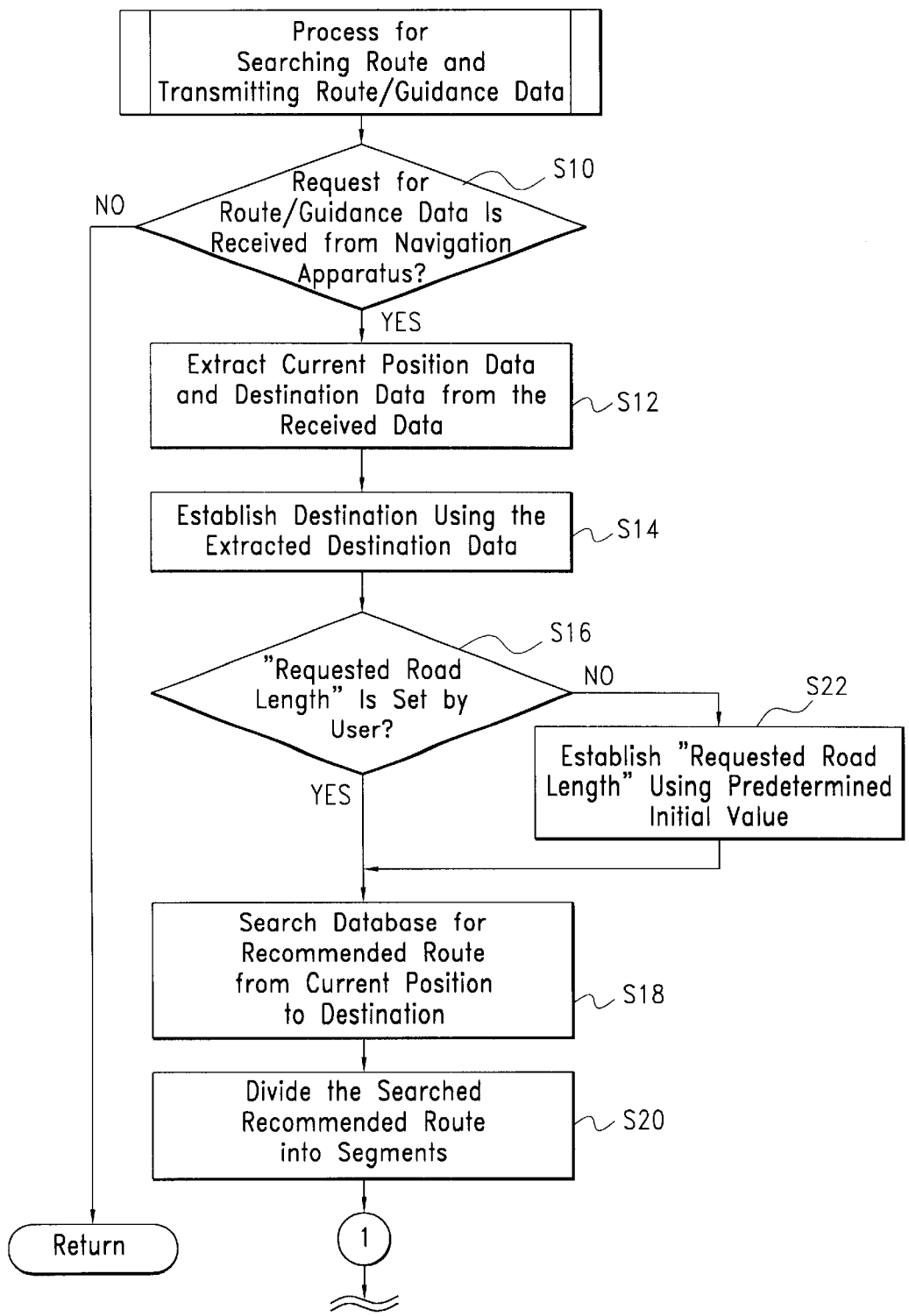
FIGS. 2A and 2B is a flaw chart which shows a route search process and route/guidance data transmission process carried out at a navigation center.

Hereinafter, a navigation method, a navigation system and an information communications apparatus used in the navigation system according to the present invention will be described in detail with reference to the appended drawings.

<Overall Structure of Navigation System>

First, with reference to FIG. 1, the overall structure of the navigation system according to the present invention will be described.

FIG. 1 is a block diagram showing the overall structure of the navigation system according to the present invention.

The navigation system according to the present invention includes at least one navigation apparatus (moving body) 100 which can be mounted on, for example, a vehicle, and a navigation center (information communications apparatus) 10 which can transmit information to and receive information from each of navigation apparatuses. In this navigation system, the navigation center 10 is configured to transmit to the navigation apparatus 100 route/guidance data (navigation data) concerning a recommended route from a current position of the vehicle to a destination. Further, the navigation apparatus 100 is configured to provide a user with route guidance using the route/guidance data received from the navigation center 10.

Next, the general structure of the navigation center 10 will be described.

The navigation center (information communications apparatus) 10 used in the navigation system according to the present invention generally includes database (memory means) 30 for storing navigation information (which includes route information 32 concerning routes and guidance information 34 including various information concerning the routes); database updating section (updating means) 40 for updating information stored in the database 30 at a predetermined time interval; route searching means for setting a recommended route from a current position of the vehicle (on which the navigation apparatus 100 is mounted) to a destination on the basis of the newest route information 32 stored in the database 30; dividing means for dividing the searched route (that is, the route set by the route searching means) into at least two portions; extracting means for extracting guidance data concerning at least a head portion of the route divided by the dividing means from the database 30; a transmission and reception section (transmitting means) 12 for transmitting the extracted route data and guidance data (route/guidance data) from the navigation center 10 to the navigation apparatus 100; and a CPU (control means) 16 for controlling each of these elements.

In the navigation center 10 having the structure as described above, the CPU 16 controls the route searching means to set a recommended route from a current position of the vehicle to the destination on the basis of the newest route information 32 stored in the database 30; controls the dividing means to divide the recommended route set by the route searching means into at least two portions; controls the extracting means to extract the guidance data concerning at least a head portion of the recommended route divided by the dividing means from the database 30; and then controls the transmission and reception section 12 to transmit the extracted route/guidance data from the navigation center 10 to the navigation apparatus 100; after transmitting the route/guidance data for the head portion to the navigation apparatus 100 but before transmitting the route/guidance data for the recommended route which is newly searched (set) by the route searching means.

Further, the navigation center 10 also includes judging means and changing means.

The judging means is utilized when making a judgement as to whether or not a predetermined request transmission point on the head portion is positioned within a communications unable area or a poor communications area. Further, the judging means is also utilized when making a judgement as to whether or not a part of the head portion of the recommended route where the vehicle which has reached a predetermined request transmission point is expected to move until the navigation apparatus 100 completely receives the route/guidance data for the head portion from the navigation center 10 is partially or completely included in a communications unable area or a poor communications area.

The changing means is utilized for changing the request transmission point to other point in a case where it is judged by the judging means that the predetermined request transmission point on the head portion is positioned within the communications unable area or the poor communications area, or in a case where it is judged that the part of the head portion of the recommended route where the navigation apparatus 100 which has reached the request transmission point is expected to move until the navigation apparatus 100 completely receives all of the route/guidance data for the head portion from the navigation center 10 is partially or completely included in the communications unable area or the poor communications area.

In this invention, the judgement by the judging means and the change of the request transmission point by the changing means are executed before the route/guidance data is transmitted to the navigation apparatus 100 via the transmission and reception section 12 of the navigation center 10.

According to the navigation center 10 of the navigation system as described above, in the case where, for example, it is judged that the predetermined request transmission point is positioned within a tunnel, the request transmission point is changed to other point. This allows the navigation center 10 to reliably receive the request from the navigation apparatus 100. Further, in the case where, for example, it is judged that the part of the head portion of the route where the vehicle which has reached the request transmission point is expected to move until the navigation apparatus 100 completely receives all of the route/guidance data for the head portion from the navigation center 10 is partially included in a tunnel, the request transmission point is also changed to other point. This allows the navigation apparatus 100 to reliably receive the route/guidance data from the navigation center 10.

In this connection, the "request transmission point" described above means a predetermined point on a route where the navigation apparatus 100 transmits a request for next route/guidance data to the navigation center 10. Namely, the navigation apparatus 100 transmits to the navigation center 10 a request of a search for setting (searching/calculating) a recommended route from the current position of the vehicle to the destination when reaching the predetermined request transmission point on the head portion of the divided route whose route/guidance data has been received from the navigation center 10 and along which the vehicle is moving. In this way, the navigation apparatus 100 can receive from the navigation center 10 route/guidance data formed based on the newest route information every time upon reaching the predetermined request transmission points.

According to the present invention described above, the navigation apparatus 100 can transmit the request to the navigation center 10 from a point which is neither a communications unable area nor a poor communications area. This allows the navigation center 10 to reliably receive the request from the navigation apparatus 100. Further, the navigation apparatus 100 can receive the route/guidance data from the navigation center 10 at an area which is neither a communications unable area nor a poor communications area. This allows the navigation apparatus 100 to reliably receive the route/guidance data from the navigation center 10.

Next, the structure of the navigation system 10 will be described in more detail.

The transmission and reception section 12 is a communications device which includes a transmitting device and a receiving device, and is used in order to receive information (data) from and transmit information to the navigation apparatus 100. For this purpose, it is possible to utilize various communications means such as car phones, portable telephones, PHS (Personal Handy-phone System) or the like.

A processing section 14 includes the CPU 16 for processing various operations and a memory 18 which stores various data and programs.

The memory 18 stores various programs used in the navigation center 10, such as a route search program 20 for searching (calculating) a recommended route from a current position (the navigation starting point or the departure point) of the vehicle on which the navigation apparatus 100 is mounted to a destination (the navigation ending point), and for extracting route data corresponding to the searched route from the route information 32 in the database 30; a segment processing program 22 for dividing the searched route into segments and for establishing road length of each segment to be transmitted to the navigation apparatus 100; a guidance data extracting program 24 for extracting guidance data corresponding to the road length established by the segment processing program 22 and then editing the extracted guidance data; a communication judgement program 25 for judging the suitability of the data transmission; a system control program 26 for controlling the overall operations carried out in the navigation center 10; and the like. Further, the memory 18 also has work areas used to run each of these programs.

The database 30 stores various information required for route search and route guidance, such as route information 32 which is used when searching a recommended route; guidance information 34 which includes various information for route guidance; communications area information 36 including information related to communications areas; and destination establishment information 38 including information used for establishing the destination, such as telephone number, address and the like. The route information 32 includes intersection data, road data, node point data and the like. Further, the guidance information 34 includes various guidance data, such as map data of each intersection and road, landmark data used for displaying primary facilities, and audio guidance data. The communications area information 36 includes data related to communication condition at communications unable areas where radio waves can not reach and at poor communications areas where unsuitable communication occurs due to weak radio wave levels.

Further, it is also to be noted that the route search program 20, the segment processing program 22, the guidance data extracting program 24 and the communication judging program 25 serve as the route searching means, the dividing means, the extracting means and the judging means of the present invention, respectively. Further, the segment processing program 22 also serves as the changing means.

The division of the searched recommended route by the segment processing program (dividing means) 22 stored in the memory 18 is carried out by dividing the searched route into a plurality of segments. In this operation, each of the portions of the divided route is established using one segment as a unit. In this connection, a way for dividing the searched recommended route is not limited to that described above. For example, each of the portions of the divided route may be established using two or more of segments as a unit.

Further, the change of the request transmission point by the segment processing program (changing means) 22 described above is performed by increasing road length of the head portion of the divided recommended route by one segment (which will be described in detail later). In this connection, a way for changing the request transmission point is not limited to that described above. Namely, the change of the request transmission point by the segment processing program 22 may be performed by increasing the road length by two or more segments. Further, the change of the request transmission point by the segment processing program 22 may also be performed by decreasing the road length by one or more segments.

The database updating section (updating means) 40 is connected to the database 30. This database updating section 40 utilizes telephone lines or the like to gather the newest road/traffic information and communications area information (e.g., information concerning road repairs, traffic regulations, newly constructed roads and facilities, and changes of communications areas) in order to constantly (or in a predetermined interval) update each information stored in the database 30.

Next, the structure of the navigation apparatus 100 will be described in detail.

The navigation apparatus 100 has a processing section 101 which includes a CPU as a main component. Further, the navigation apparatus 100 is provided with a memory 102 having a program storing area 102A for storing various programs run by the processing section 101, such as a route guidance program 150 for displaying routes, landmarks and the like on a display 106 and outputting audio route guidance from an audio output section 107 using route/guidance data (navigation data) received from the navigation center 10; a data request program 152 for producing a request of transmission for next route/guidance data by comparing the current position of the vehicle with the received route/guidance data; and a control program 154 for controlling operations carried out in the navigation apparatus 100.

The memory 102 also has a data storing area 102B which, in addition to serving as a work area utilized when running programs, stores various data, such as route/guidance data (navigation data) 160 transmitted from the navigation center 10, ID data 162 for identifying the vehicle on which the navigation apparatus 100 is mounted, and vehicle position data (Longitude, Latitude) 164 measured by a position measuring section 104.

The vehicle position data 164 includes a current position data measured by the position measuring section 104 at a predetermined time interval as well as a plurality of past position data. The vehicle position data 164 can include, for example, position data for measurement points within a predetermined distance or position data for a predetermined number of measurement points. In this arrangement, when a new measurement is carried out by the position measuring section 104, the position data obtained through such new measurement is stored, while the stored oldest position data is erased. Further, by connecting points identified by the plurality of position data, it becomes possible to obtain the travel path of the vehicle. The travel path of the vehicle is utilized in "map matching" to identify the road along which the vehicle is traveling.

The position measuring section 104 utilizes GPS and/or the like to measure the position of the vehicle. Namely, the position measuring section 104 is equipped with a GPS receiver to measure the absolute position of the vehicle on the basis of signals received from a plurality of GPS satellites. Further, the position measuring section 104 is further equipped with sensors such as a speed sensor and an azimuth sensor to measure the relative position of the vehicle. These speed sensor and azimuth sensor are used to carry out self-contained navigation. In this connection, the relative position measured by such sensors can be used to obtain the position of the vehicle when the GPS receiver is unable to receive signals from the GPS satellites (e.g., when the vehicle is running inside a tunnel or the like), or the relative position can also be used to correct position measurement errors in the absolute position measured by the GPS receiver.

The input section 105 includes devices such as various switches, a touch panel provided on the display 106, a remote control input device, and a data input device using voice recognition. With the touch panel, in order to input corresponding data and commands, a user can use a finger or the like to touch an icon or the like displayed on the screen of the display 106. With the data input device which uses voice recognition, the user can use his/her voice to input corresponding data and commands.

The display 106 includes a liquid crystal display or CRT (Cathode-Ray Tube) display unit which is equipped with the touch panel as described above.

A transmission and reception section (receiving means) 108 can receive route/guidance data transmitted from the navigation center 10. This transmission and reception section 108 is a communications device which includes a transmitting device and a receiving device. Further, in the same manner as the transmission and reception section 12 of the navigation center 10, it is possible for the transmission and reception section 108 to utilize various communications means such as car phones, portable telephones, PHS (Personal Handy-phone System) or the like.

<Operations at Navigation Center>

First, operations carried out at the navigation center 10 will be generally described.

In this invention, before route guidance is started and while the route guidance is being carried out at the navigation apparatus 100, the navigation center 10 transmits route/guidance data to the navigation apparatus 100 in accordance with the following steps (a)–(i).

Step (a): The database updating section 40 updates each information stored in the database 30.

Step (b): The CPU 16 executes the route search program 20 to set a recommended route from a current position of the vehicle to a destination on the basis of the newest route information 32 updated in the step (a), and then the CPU 16 extracts route data corresponding to the searched recommended route from the newest route information 32 in the database 30.

Step (c): The CPU 16 executes the segment processing program to divide the searched recommended route into at least two portions (e.g., segments).

Step (d): The CPU 16 executes the guidance data extracting program 24 to extract guidance data concerning at least a head portion of the divided route from the newest guidance information 34.

Step (e): The transmission and reception section 12 transmits the extracted route/guidance data (that is, navigation data including the route data extracted at the steps (b) and the guidance data extracted at the step (d)) from the navigation center 10 to the navigation apparatus 100.

Step (f): The CPU 16 executes the route search program 20 to set a recommended route from a current position of the navigation apparatus 100 to the destination on the basis of the newest route information 32 updated in the step (a) after transmitting the route/guidance data for the head portion to the navigation apparatus 100 but before transmitting route/guidance data for a remaining portion of the route to the destination, and then the CPU 16 extracts route data corresponding to the searched recommended route from the newest route information 32 in the database 30.

Step (g): The CPU 16 executes the segment processing program to divide the recommended route searched (set) at the step (f) into at least two portions.

Step (h): The CPU 16 executes the guidance data extracting program 24 to extract guidance data concerning at least a head portion of the recommended route divided at the step (g) from the newest guidance information 34.

Step (i): The transmission and reception section 12 transmits the extracted route/guidance data (that is, navigation data including the route data extracted at the steps (f) and the guidance data extracted at the step (h)) from the navigation center 10 to the navigation apparatus 100.

According to the navigation method of this invention described above, the searched route is divided into at least two portions, and then route/guidance data (navigation data) concerning a head portion of the divided route is transmitted from the navigation center 10 to the navigation apparatus 100. Thus, as compared with the case where route/guidance data concerning all route from a departure point to a destination is transmitted to the navigation apparatus 100 at one time, the amount of the route/guidance data to be transmitted to the navigation apparatus 100 at one time is reduced. This allows the navigation apparatus 100 to reliably receive the route/guidance data from the navigation center 10, and to smoothly begin route guidance.

Further, according to the navigation method, each information stored in the database 30 is constantly updated. This allows the user of the navigation apparatus 100 to obtain from the navigation center 10 the route/guidance data extracted from the database 30 storing the newest information. Namely, according to the present invention, it becomes possible to provide the user with route guidance using the route/guidance data which is formed based on the newest information that reflects various road conditions.

Furthermore, according to the navigation method, the user of the navigation apparatus 100 can always obtain from the navigation center 10 route/guidance data extracted from the database 30 storing the newest information while the user is travelling on the searched route. Namely, this invention makes it possible to transmit route/guidance data extracted from the database 30 storing the newest information to the navigation apparatus 100 from the navigation center 10 over the entire time the navigation apparatus 100 is traveling to the destination (instead of carrying out such transmission only at the time of departure of the navigation apparatus 100 toward the destination).

As described above, the navigation apparatus 100 transmits to the navigation center 10 a request of the recommended route search for setting the recommended route from the current position of the vehicle to the destination when reaching a predetermined request transmission point on the head portion of the divided whose route/guidance data (navigation data) has been received from the navigation center 10 and along which the vehicle is moving. Further, each time when the navigation center 10 receives the request from the navigation apparatus 100, the CPU 16 of the navigation center 10 executes each of the route search program 20, the segment processing program 22 and the guidance data extracting program 24 and then controls the transmission and reception section 12 to transmit the extracted route/guidance data. Namely, each time when the navigation center 10 receives the request from the navigation apparatus 100, the steps (f) to (i) described above are executed at the navigation center 10.

Further, when traffic situation or road condition of an untraveled portion of the head portion is changed while the vehicle is on the route corresponding to the head portion whose route/guidance data has been received from the navigation center 10, the steps (f) to (i) described above are also executed at the navigation center 10.

According to the present invention described above, even if, for example, traffic congestion has occurred due to a car accident anywhere on an untraveled portion of the searched recommended route where the navigation apparatus 100 has not yet traveled, it is possible for the navigation apparatus 100 to obtain from the navigation center 10 route/guidance data concerning a recommended route that enables the navigation apparatus 100 to avoid such a traffic congestion.

Next, the operations of the navigation center 10 will be described in more detail with reference to FIGS. 2A and 2B.

Figure 2B:
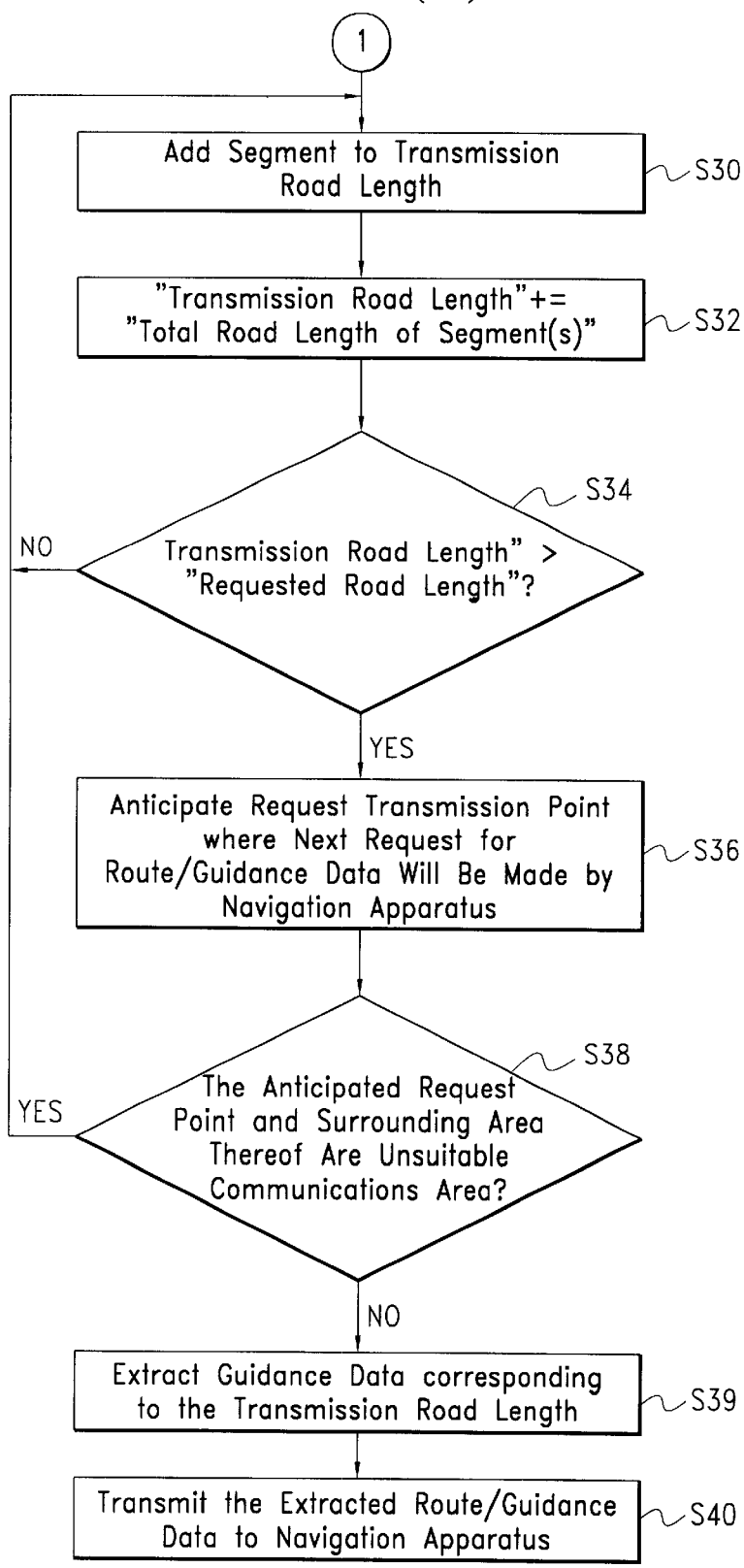

In this regard, FIGS. 2A and 2B is a flow chart showing the route search process and route/guidance data transmission process carried out in the navigation center 10.

First, in the navigation apparatus 100, the control program 154 stored in the memory 102 is run by the processing section 101. In this operation state, when the data request program 152 stored in the memory 102 is run in accordance with a request command inputted by a user, data including the current position of the vehicle measured by the position measuring section 104, the destination, and the road length for which the user requests to transmit route/guidance data is transmitted to the navigation center 10 via the transmission and reception section 108 (see Step S50 in FIG. 5 which will be described below). At this time, vehicle ID data is also transmitted to the navigation center 10 to discriminate the vehicle on which the navigation apparatus 100 is mounted from other vehicles. Then, in the navigation center 10, each of such data transmitted from the navigation apparatus 100 is received by the transmission and reception section 12 (i.e., a YES judgement at Step S10) and then sent to the processing section 14 of the navigation center 10. In this connection, the data communications carried out between the navigation center 10 and the navigation apparatus 100 may be carried out using, for example, a packet exchange technique.

Next, the processing section 14 of the navigation center 10 runs the system control program 26 stored in the memory 18. Further, the route search program 20 stored in the memory 18 is run by the CPU 16, whereby a route search is carried out based on each data received from the navigation apparatus 100. Namely, first, the vehicle current position data and the destination data are extracted from the received data (Step S12). Then, the destination is established using the extracted destination data (Step S14). For example, in the case where data such as a telephone number, address or the like is received from the navigation apparatus 100 as destination data, the destination is established using the destination establishment information 38 in the database 30.

Next, when a requested road length (which is a road length requested by the user) has been specified in the received data (i.e., a YES judgement at Step S16), this data (requested road length data 27) is stored in the memory 18, and then a recommended route from a current position of the vehicle to the destination is searched (Step S18). On the other hand, when a requested road length has not been specified in the received data (i.e., a NO judgement at Step S16), requested road length data is generated using a pre-arranged initial value, and then the generated data (requested road length data 27) is stored in the memory 18 (Step S22). Then, a recommended route from a current position of the vehicle to the destination is searched (Step S18).

This route search is carried out by referring to the route information 32 in the database 30, namely, by referring to intersection data, road data, node data and the like. In carrying out such route search, the route having the shortest overall length is established as the recommended route. In this regard, such route search process is well known, and examples thereof are disclosed in Japanese Laid-Open Patent Publication Nos. HEI 1-173297 and HEI 1-173298.

In the present embodiment, a recommended route from a current position of the vehicle to the destination is searched each time when a request is received from the navigation apparatus 100. Further, in the navigation center 10, new road information and traffic information are received in a predetermined interval from the outside by the database updating section 40. In this way, the database 30 of the navigation center 10 is updated with the newest information. Accordingly, by carrying out a route search in response to each request from the navigation apparatus 100, it becomes possible for the navigation apparatus 100 to obtain from the navigation center 10 route/guidance data concerning a recommended route that is searched based on the newest information updated by the database updating section 40. In this way, for example, it becomes possible to avoid traffic congestion that has occurred just after route guidance is started.

Next, the CPU 16 of the processing section 14 runs the segment processing program 22 stored in the memory 18 to divide the searched route into a predetermined number of segments, wherein one segment is used as a unit for route/ guidance data (navigation data) (Step S20). In this regard, each segment may be established so as to have the same number of bits (e.g., so that one segment has 1024 bytes). Further, each segment may also be established so as to have a substantially uniform road length (e.g., 2000 meters).

Figure 3:
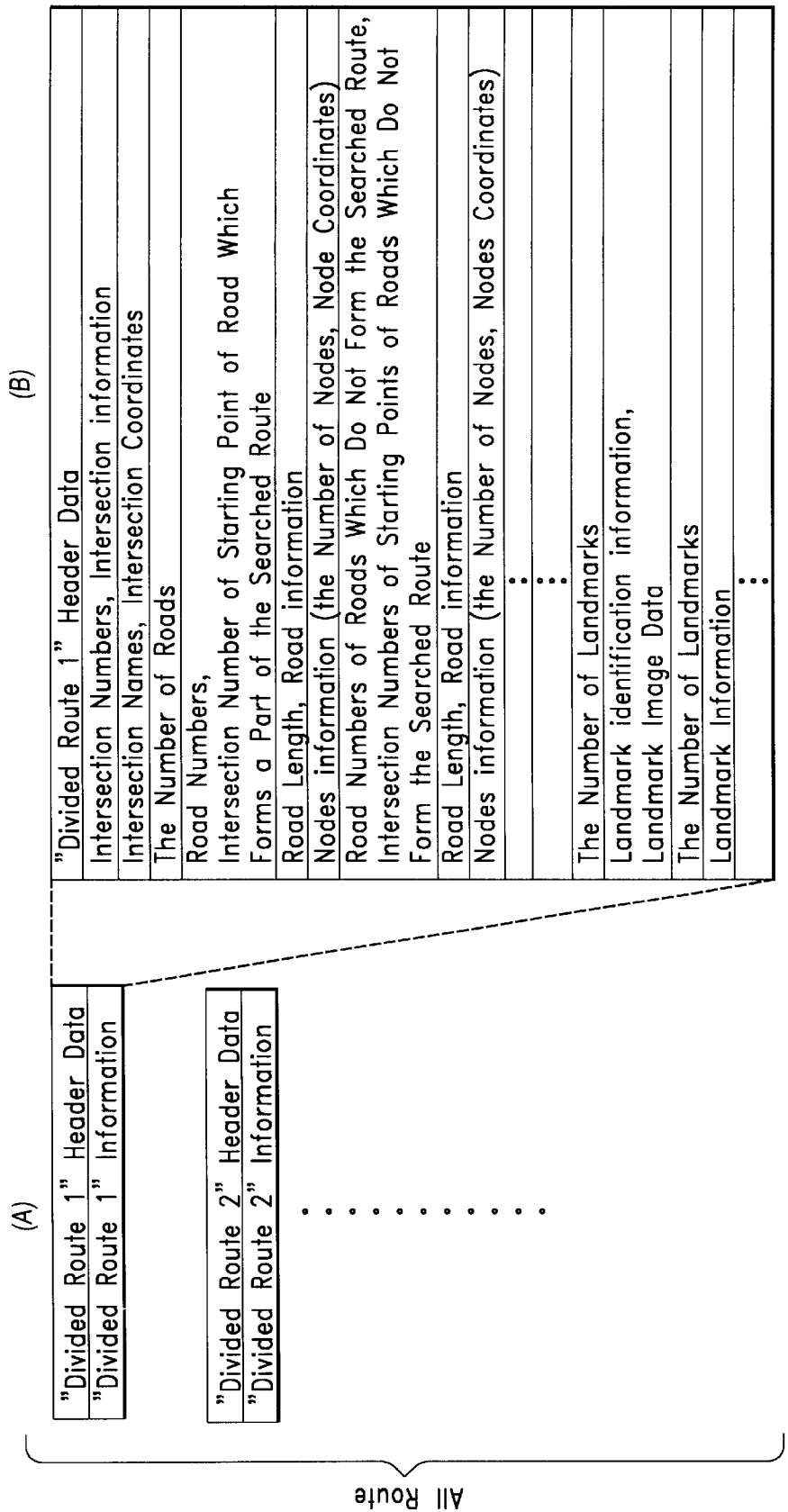
FIG. 3 is a diagram which shows segments of a divided searched route, and shows an example of the contents of one of the segments.

For example, the entire searched route can be divided into a plurality of divided routes like the Divided Route 1, Divided Route 2, . . . shown in FIG. 3(A). Namely, each portion of the divided route forms one segment. Further, as shown in FIG. 3(B), each divided route data (that is, segment) includes header data, intersection data, road data, node data, landmark data and the like.

Dividing the searched route into segments has the following two advantages:

(1) Even in the case where communications between the navigation center 10 and the navigation apparatus 100 are interrupted during the transmission of the route/guidance data, it is still possible to carry out route guidance during such interruption time by using the route/guidance data for the segments that were completely received before the interruption occurred.

(2) In the case where communications between the navigation center 10 and the navigation apparatus 100 are interrupted during the transmission of the route/guidance data, as soon as communications are resumed, transmission of the route/guidance data for the remaining segments can be restarted from the segment whose transmission was incomplete when the interruption in communications occurred.

In this regard, one segment forms an information unit that can be decoded at the navigation apparatus 100. For example, if the entire route data of a 10 km route is transmitted as a single file to the navigation apparatus 100 and the navigation apparatus 100 can not decode such file, then route guidance for the entire 10 km route will not be possible. However, if such 10 km route is divided into five segments each having data for 2 km route and then the data for each segment is transmitted as a single file to the navigation apparatus 100, the navigation apparatus 100 can easily decode such files since each file includes small amount of data, whereby route guidance can be carried out using the route/guidance data for each 2 km segment.

Further, in the processing section 14, within the range of the searched route, the segments are added in a sequential manner starting from the segment closest to the vehicle position (Step S30), and then these added segments form a transmission road length (Step S32). Namely, following calculation is repeated to add the segments one by one.

"Transmission Road Length (total road length of segments)"="Transmission Road Length (total road length of segments)"+"Road Length of Added Segment"

This process of adding the road lengths of each segment one by one is repeated until the total transmission road length becomes longer than the requested road length described above (i.e., such adding process is repeated for each NO judgement made at Step S34).

Then, when the condition "transmission road length>requested road length" (or "transmission road length≧requested road length") is satisfied (i.e., when a YES judgement is made at Step S34), the CPU 16 of the processing section 14 runs the communication judging program 25 stored in the memory 18 to anticipate a vehicle position (request transmission point) where the next request for route/guidance data will be made by the navigation apparatus 100 (Step S36). In other words, the processing section 14 anticipates a point on the road of which route/ guidance data has been already transmitted and from which the navigation apparatus 100 will make a request of route/ guidance data for the next segment. For example, an anticipation like "the navigation apparatus will transmit a request for route/guidance data for the next segment at a point about 200 m before the end point of the divided route portion" can be made.

Next, with reference to the communications area information 36 in the database 30, the processing section 14 judges whether or not the anticipated request transmission point and the surrounding area thereof are positioned within an unsuitable communications area (i.e., a communication unable area where data communications between the navigation center 10 and the navigation apparatus 100 is impossible, or a poor communications area where data communications is difficult to perform) (Step S38). In this regard, an "unsuitable communications area" means an area where there is a high probability that the data communications between the navigation center 10 and the navigation apparatus 100 will be hindered, such as areas outside the communication service areas, tunnels, congested communications areas and unstable communications areas.

Now, in the case where it is judged that the anticipated request transmission point and the surrounding area thereof are positioned within an unsuitable communications area (i.e., a YES judgement at Step S38), another segment is added to the transmission road length (Step S30). Then, the processes shown in Steps S36 and S38 are repeated by the processing section 14 with respect to the added segment.

On the other hand, in the case where it is judged that the anticipated request transmission point and the surrounding area thereof are not positioned within an unsuitable communications area (i.e., a NO judgement at Step S38), the guidance data extracting program 24 stored in the memory 18 is run. Then, by referring to the guidance information 34 stored in the database 30, guidance data corresponding to the transmission road length is searched and extracted (Step S39). This extracted guidance data 29 is stored in the memory 18. The route data and guidance data (route/ guidance data) obtained in the way described above is transmitted together with the vehicle ID to the navigation apparatus 100 via the transmission and reception section 12 (Step S40). At this time, the segmented route/guidance data is transmitted to the navigation apparatus 100 in a sequential manner starting with the segment closest to the current position of the vehicle.

Next, the above operations will be described with reference to FIG. 4.

Figure 4:
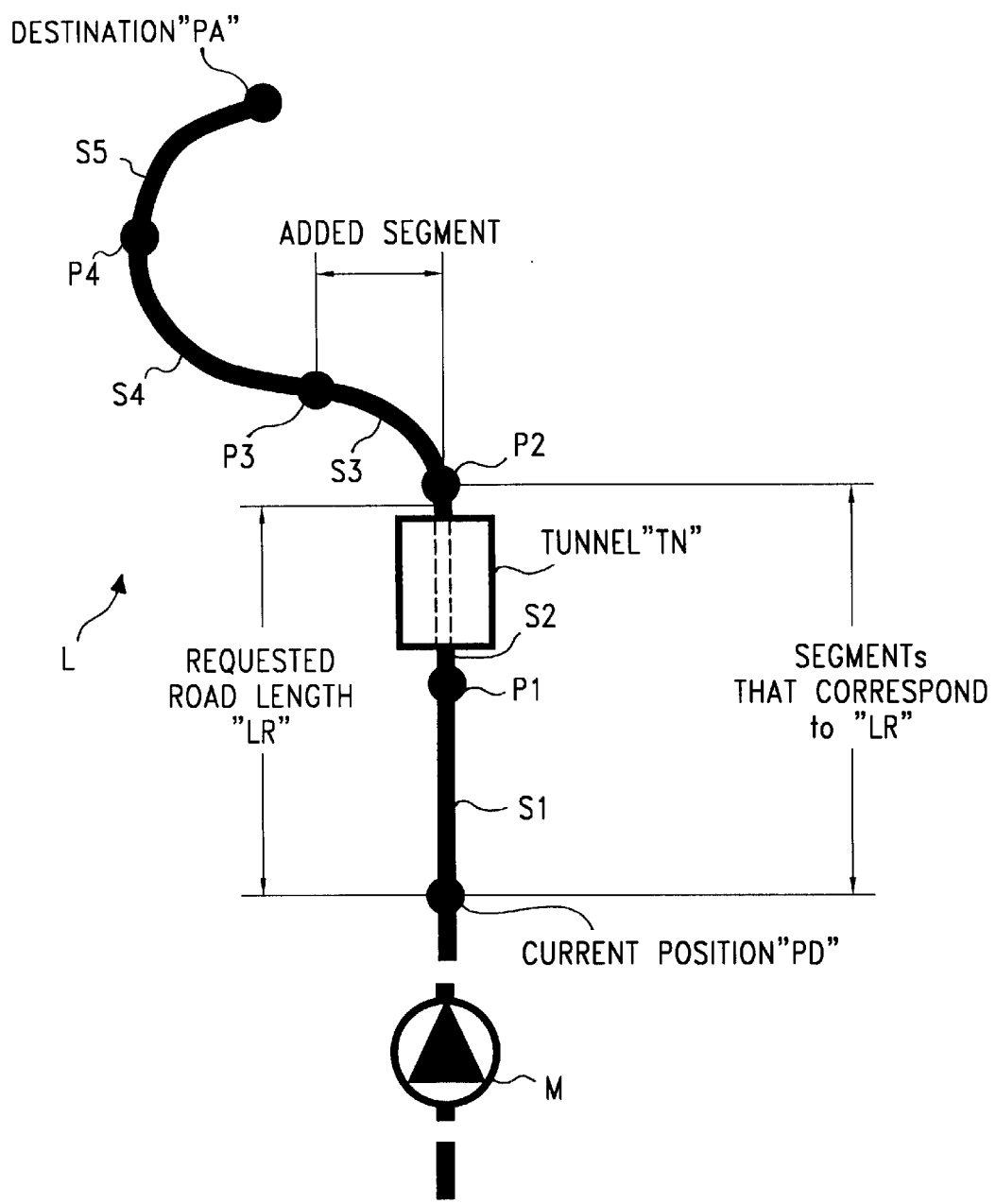
FIG. 4 is a map which shows an example of a searched route.

In this regard, FIG. 4 is a map showing an example of a searched recommended route. In this map, the bold line L represents the searched recommended route from a current position PD of the vehicle to a destination PA. Further, the mark M indicates the current position of the vehicle on which the navigation apparatus 100 is mounted.

As is further shown in FIG. 4, the searched route L is divided into five segments S1–S5, and segment division points P1–P4 are shown at the points between adjacent segments.

In this example, if the requested road length is LR, then the addition of the segment S1 to the segment S2 makes the transmission road length greater than the requested road length LR. However, the navigation apparatus cannot transmit to the navigation center 10 a request for next route/ guidance data, because the request transmission point of the segment S2 is located in the tunnel TN. Accordingly, the next segment S3 is added to the transmission road length. Then, because the terminal point of the segment S3 is not an unsuitable communications area, the added segments S1–S3 form the transmission road length, and route data and guidance data related thereto are extracted and transmitted to the navigation apparatus 100. Namely, route/guidance data for the segments S1–S3 is transmitted to the navigation apparatus 100.

<Operations at Navigation Apparatus>

Next, the operations carried out at the navigation apparatus 100 will be described with reference to FIG. 5.

Figure 5:
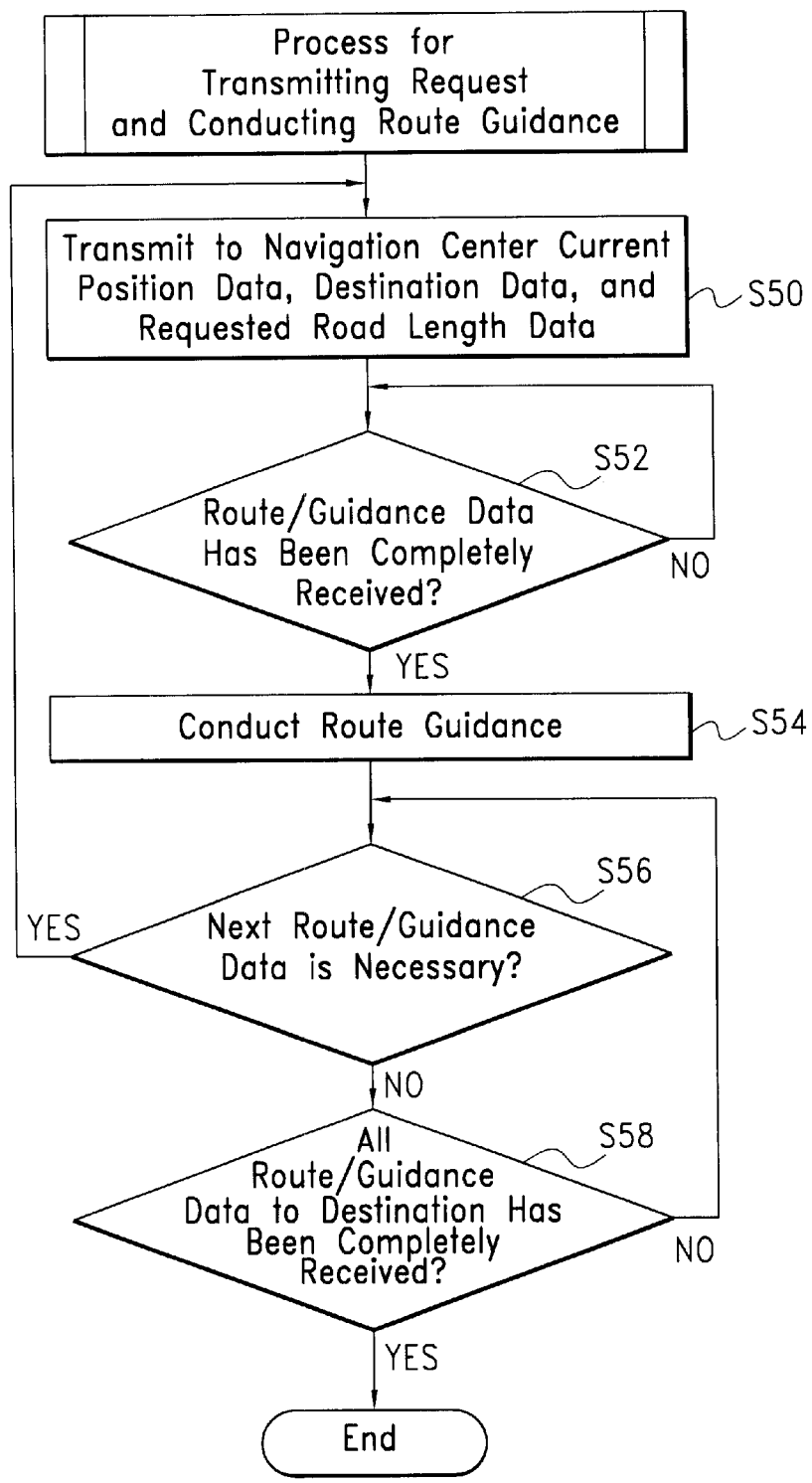
FIG. 5 is a flow chart which shows request transmission process and route guidance process carried out at a navigation apparatus.

In this regard, FIG. 5 is a flow chart showing the request transmission process and the route guidance process carried out at the navigation apparatus 100. Now, because the process carried out at Step S50 in FIG. 5 was already described above, the flow chart will be described from Step S52.

Namely, when the transmission and reception section 108 receives the above-described route/guidance data from the navigation center 10 (i.e., when a YES judgement is made at Step S52), the processing section 101 controls the memory 102 to store the received route/guidance data 160 therein. Then, the route guidance program 150 stored in the memory 102 is run, and route guidance is carried out using the received route/guidance data 160 (Step S54). During this route guidance operation, a route map and landmarks are displayed on the display 106, and related audio guidance such as instructions on turning right or left at intersections is outputted from the audio output section 107.

At the same time, the processing section 101 refers to the current position of the vehicle measured by the position measuring section 104 and runs the data request program 152. Then, when the vehicle reaches a point (that is, request transmission point) at a predetermined distance from the end point of the received route (e.g., 200 m before such end point), a request for the next route/guidance data is transmitted to the navigation center 10 (i.e., a YES judgement is made at Step S56).

Subsequent to the operation described above, the navigation center 10 carries out various processes (including a route search process, a segment dividing process, a communication conditions judgement process, a transmission road length establishment process, and a guidance data extraction process) based on the data transmitted at Step S50 from the navigation apparatus 100, and then the route/guidance data obtained thereby is transmitted to the navigation apparatus 100. On the other hand, when no request is carried out, (i.e., when a NO judgement is made at Step S56), a judgement of whether or not all the route data to the destination has been received is carried out (Step S58), and in the case where all the route/guidance data to the destination is judged to be received by the navigation center 10, the "request transmission process" and "route guidance process" is terminated.

Figure 6:
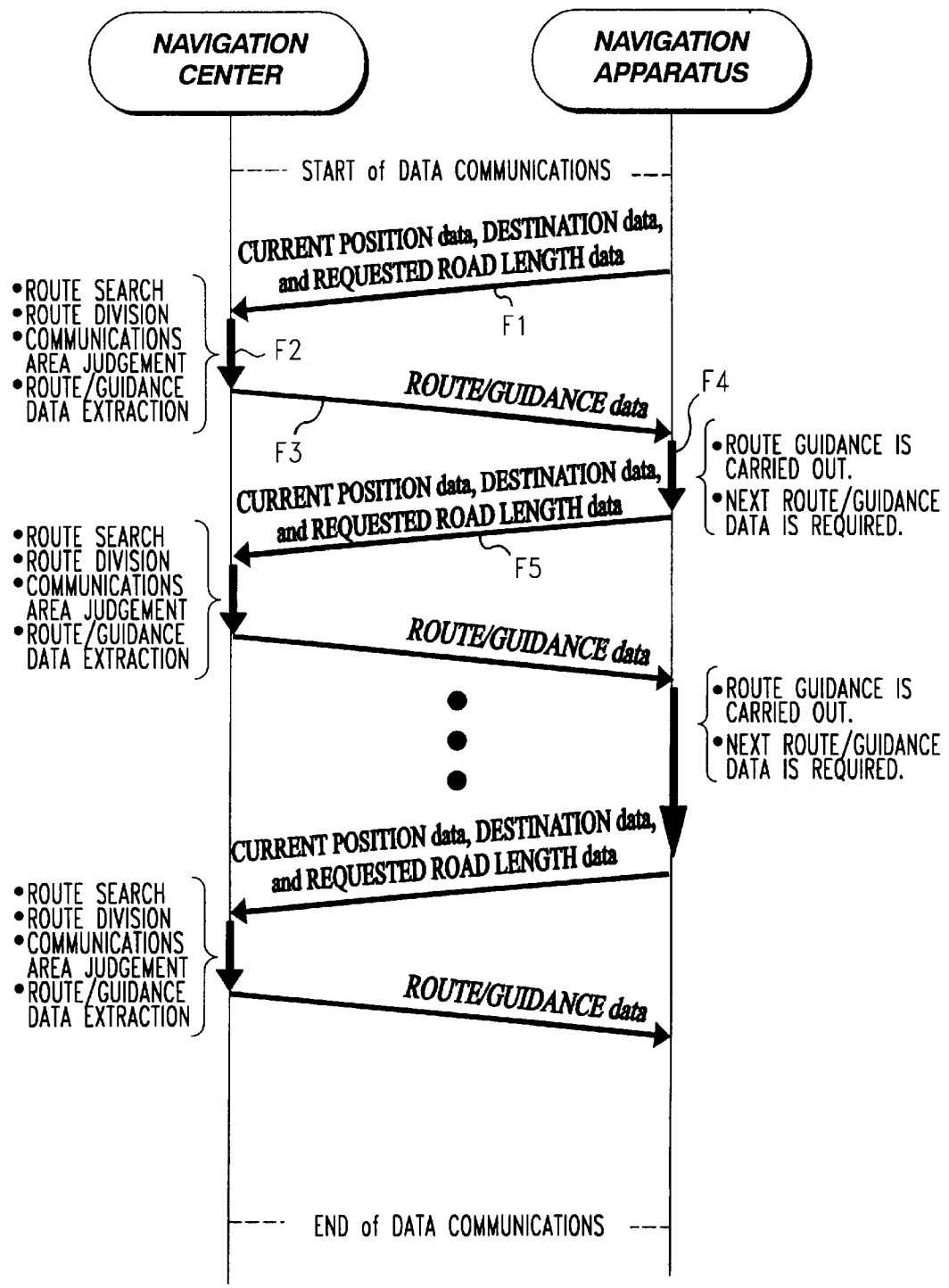
FIG. 6 is a diagram which illustrates contents of data communications and a manner in which such data communications are carried out between the navigation center and the navigation apparatus.

In this connection, FIG. 6 shows an example of data communications carried out between the navigation center 10 and the navigation apparatus 100.

In particular, FIG. 6 is a diagram illustrating the contents of the data communications and the manner in which such data communications are carried out between the navigation center 10 and the navigation apparatus 100.

First, as shown by the arrow F1, the navigation apparatus 100 transmits to the navigation center 10 the current vehicle position data, the destination data and the request road length data. Then, as shown by the arrow F2, a route search, a route division, a communications area judgement and a guidance data extraction are carried out at the navigation center 10 based on the data received from the navigation apparatus 100. Next, as shown by the arrow F3, extracted route/guidance data is transmitted from the navigation center 10 to the navigation apparatus 100.

Then, as shown by the arrow F4, route guidance is carried out at the navigation apparatus 100 based on the data received from the navigation center 10. In this operation, it is to be noted that data which is no longer required is erased. At this point, if route/guidance data is still required in order to carry out route guidance, the navigation apparatus 100 once again transmit to the navigation center 10 the current vehicle position, the destination and the request road length, as shown by the arrow F5. Then, the same operations are repeated until the vehicle on which the navigation apparatus 100 is mounted reaches the destination.

In accordance with the present invention described above, the following results are achieved.

(1) In the present invention, when navigation data for each of the portions of the divided route is transmitted from the navigation center to the moving body (navigation apparatus), a judgement of communication conditions at a request transmission point is carried out at the transmission time. As a result, the moving body can reliably receive navigation data transmitted from the moving body regardless of the radio wave conditions. Accordingly, it becomes possible to provide a navigation system capable of carrying out highly reliable data communications.

(2) Because the navigation data is transmitted in the form of segments, even in the case where communications between the navigation center and the moving body are interrupted, it is still possible to carry out route guidance during such interruption time by using the data of the segments that were received by the moving body before the interruption occurred. Further, when communications are resumed, transmission of the segments can be restarted from the segment whose transmission was incomplete when the interruption occurred.

(3) In the present invention, the database of the navigation center is constantly updated. Further, the route search process and the guidance data extraction process are carried out each time upon a request being received from the moving body. As a result, route guidance is always carried out based on the newest road information and traffic information.

(4) In the present invention, a route search from the current position of the moving body to the destination is carried out each time a request is made. Therefore, even in the case where the moving body strays from the original recommended route, the moving body can obtain navigation data of a new recommended route from the current position of the vehicle to the destination. As a result, the user can drive with peace of mind.

It should be noted that many modifications and additions can be made in accordance with the present invention. For example, the embodiment described above may be modified as described below.

(1) In the embodiment described above, the navigation apparatus transmits the destination data to the navigation center every time route/guidance data is requested. However, instead of this arrangement, the navigation center may be constructed so as to store the destination data in the first route/guidance data request received from the navigation apparatus. In this way, it is sufficient for the navigation apparatus to transmit the destination data only once together with the first request for route/guidance data. This makes it possible to shorten transmission times and omit the destination establishment process when receiving subsequent requests.

(2) In the embodiment described above, the requested road length is set at the navigation apparatus. However, it is also possible to set the requested road length on the basis of the memory capacity at the navigation apparatus. Further, the requested road length may be the same for every request, or the requested road length may be different for every request. Furthermore, without extending (increasing) the road length, it is also possible to change a point where route/guidance data is expected to be transmitted from the navigation center to the navigation apparatus. For example, it is possible to configure the system so that a request is transmitted to the navigation center at a position 400 m before the end point of the divided route portion in the case where the point 200 m before the end point of the divided route portion is unsuited for communication.

(3) The number of segments described in the above embodiment is mere one example of the possible number of segments, and therefore it can be set appropriately. Further, depending on requirements, the road length may be increased or decreased by a segment as a unit.

(4) In the embodiments described above, a route search from the current position of the vehicle to the destination is carried out upon received each request, but it is also possible to carry out a route search from the end point of the divided road portion to the destination.

(5) Even though the embodiments described above are for the case where the present invention is applied to moving vehicles, the present invention may be used with any moving bodies such as portable devices, mobile terminals and the like.

(6) In the embodiments described above, the navigation apparatus is configured so as to transmit to the navigation center a request of route search for setting a recommended route from a current position of the vehicle to a destination when reaching a predetermined request transmission point on a head portion (of the divided searched route) whose route/guidance data has been received from the navigation center and along which the vehicle is moving. Further the navigation center is configured so as to execute the steps (f) to (i) described above each time when the navigation center receives the request from the navigation apparatus. However, the navigation center and the navigation apparatus may be configured as follows.

Namely, when the navigation center detects that the vehicle reaches a predetermined route search point on a head portion (of the divided searched route) whose route/guidance data has been received from the navigation center and along which the vehicle is moving, the navigation center automatically executes the steps (f)–(i) described above. In this operation, the CPU executes each of the route search program, the segment processing program, the guidance data extracting program and controls the transmission and reception section, whereby the navigation apparatus receives from the navigation center route/guidance data for a remaining portion of the route without transmitting to the navigation center a request of transmission for navigation data.

According to the modification described above, the navigation apparatus can obtain from the navigation center route/guidance data for the remaining portion of the route without transmitting to the navigation center a request of transmission for navigation data, when the vehicle reaches the predetermined route search point.

In accordance with the present invention described above, the following results are achieved.

(1) According to the present invention described above, the determined route is divided into at least two portions, and then navigation data concerning the head portion of the divided route is transmitted from the navigation center to the moving body. Thus, as compared with the case where navigation data concerning all route from a departure point to a destination is transmitted to the moving body at one time, the amount of the navigation data to be transmitted to the moving body at one time is reduced. This allows the moving body to reliably receive the navigation data from the navigation center, and to smoothly begin route guidance.

(2) According to the present invention described above, the navigation information stored in the memory means is constantly updated. This allows the user of the moving body to obtain from the navigation center the navigation data extracted from the newest navigation information. Namely, according to the present invention, it becomes possible to provide the user with route guidance using the navigation data which is formed based on the newest navigation information that reflects various road conditions.

(3) According to the present invention described above, a user of the moving body can always obtain from the navigation center navigation data extracted from the newest navigation information while the user is travelling on the route. Namely, this invention makes it possible to transmit navigation data extracted from the newest navigation information to the moving body from the navigation center over the entire time the moving body is traveling to the destination (instead of carrying out such transmission only at the time of departure of the moving body toward the destination).

(4) According to the present invention described above, the moving body can obtain from the navigation center the navigation data extracted from the newest navigation information each time when the moving body reaches the predetermined request transmission points.

(5) According to the present invention described above, in the case where, for example, it is judged that the predetermined request transmission point is positioned within a tunnel, the request transmission point is changed to other point. This allows the navigation center to reliably receive the request from the moving body. Further, in the case where, for example, it is judged that the part of the head portion of the route where the moving body which has reached the request transmission point is expected to move until the moving body completely receives all of the navigation data for the head portion from the navigation center is partially included in a tunnel, the request transmission point is also changed to other point. This allows the moving body to reliably receive the navigation data from the navigation center.

(6) According to the present invention described above, the moving body can transmit the request to the navigation center from a point which is neither a communications unable area nor a poor communications area. This allows the navigation center to reliably receive the request from the moving body. Further, the moving body can receive the navigation data from the navigation center at an area which is neither a communications unable area nor a poor communications area. This allows the moving body to reliably receive the navigation data from the navigation center.

(7) According to the present invention described above, the moving body can obtain from the navigation center navigation data for a remaining portion of the route without transmitting to the navigation center a request of transmission for navigation data, when the moving body reaches the predetermined route search point.

(8) According to the present invention described above, even if, for example, traffic congestion has occurred due to a car accident anywhere on an untraveled portion of the route where the moving body has not yet traveled, it is possible for the moving body to obtain from the navigation center navigation data concerning a route that enables the moving body to avoid such a traffic congestion.

Finally, it is to be understood that many changes and additions may be made to the embodiments described above without departing from the scope and spirit of the invention as defined in the appended Claims.

What is claimed is:

1. A navigation method in which navigation data concerning a route from a current position of a moving body to a destination is transmitted from a navigation center to the moving body, and then route guidance is carried out at the moving body using the navigation data received from the navigation center, the method comprising the steps of:

(a) updating navigation information which includes various information concerning routes, the navigation information being stored in memory means provided in the navigation center;

(b) conducting a route search for setting a route from a current position of the moving body to a destination on the basis of the newest navigation information updated in the updating step (a);

(c) dividing the route set at the route searching step (b) into at least two portions;

(d) extracting navigation data concerning at least a head portion of the route divided at the dividing step (c) from said memory means storing the newest navigation information updated in the updating step (a);

(e) transmitting the navigation data extracted at the extracting step (d) from the navigation center to the moving body;

(f) conducting a route search for setting a route from a current position of the moving body to the destination on the basis of the newest navigation information updated in the updating step (a) after transmitting the navigation data for the head portion to the moving body but before transmitting navigation data for a remaining portion of the route;

(g) dividing the route set at the route searching step (f) into at least two portions;

(h) extracting navigation data concerning at least a head portion of the route divided at the dividing step (g) from said memory means storing the newest navigation information updated at the updating step (a); and (i) transmitting the navigation data extracted at the extracting step (h) from the navigation center to the moving body.

2. The navigation method as claimed in claim 1, wherein the moving body transmits to the navigation center a request for the route searching to set the route from the current position of the moving body to the destination when reaching a predetermined request transmission point on the head portion for which navigation data has been received from the navigation center and along which the moving body is moving, and wherein the steps (f) to (i) are executed each time when the navigation center receives the request from the moving body.

3. The navigation method as claimed in claim 2, further comprising the steps of:

making at least one judgement from a group of judgements including a judgement as to whether or not the predetermined request transmission point on the head portion is within an area wherein communication between the moving body and the navigation center is either impossible or of poor quality and a judgement as to whether or not a part of the head portion of the route including a position where the moving body, which has reached the request transmission point, is expected to be located when transmission of the navigation data for the head portion from the navigation center is completed, is partially or completely within an area wherein communication between the moving body and the navigation center is either impossible or of poor quality; and changing the request transmission point to another point when either of said judgements is affirmative; wherein the judging step and the changing step are executed before the step (e) or (i).

4. The navigation method as claimed in claim 3, wherein the step of changing the request transmission point is performed by increasing road length of the head portion.

5. The navigation method as claimed in claim 4, wherein the division of the route at each of the steps (c) and (g) is carried out by dividing the route into a plurality of segments, wherein each of the portions of the route divided at the dividing step (c) or (g) is established using one or more of the segments as a unit, and wherein the step of changing the request transmission point is performed by increasing the road length of the head portion by at least one segment.

6. The navigation method as claimed in claim 3, wherein the step of changing the request transmission point is performed by decreasing road length of the head portion.

7. The navigation method as claimed in claim 6, wherein the division of the route at each of the steps (c) and (g) is carried out by dividing the route into a plurality of segments, wherein each of the portions of the route divided at the dividing step (c) or (g) is established using one or more of the segments as a unit, and wherein the step of changing the request transmission point is performed by decreasing the road length of the head by at least one segment.

8. The navigation method as claimed in claim 1, wherein when the navigation center detects that the moving body reaches a predetermined route search point on the head portion whose navigation data has been received from the navigation center and along which the moving body is moving, the navigation center automatically executes the steps (f)–(i), whereby the moving body receives from the navigation center navigation data for a remaining portion of the route.

9. The navigation method as claimed in claim 1, wherein when traffic situation or road condition of an untraveled route of the head portion is changed while the moving body is on the route corresponding to the head portion whose navigation data has been received from the navigation center, the steps (f)–(i) are executed.

10. The navigation method as claimed in claim 1 wherein the steps (f) through (i) are executed each time when the navigation center receives a request from the moving body for transmission of the navigation data and the guidance data.

11. A navigation system in which navigation data concerning a route from a current position of a moving body to a destination is transmitted from a navigation center to the moving body, and then route guidance is carried out at the moving body using the navigation data received from the navigation center, the system comprising:

memory means provided in the navigation center for storing navigation information which includes various information concerning routes;

updating means provided in the navigation center for updating the navigation information stored in said memory means;

route searching means provided in the navigation center for setting a route from a current position of the moving body to a destination on the basis of the newest navigation information stored in said memory means;

dividing means provided in the navigation center for dividing the route set by said route searching means into at least two portions;

extracting means provided in the navigation center for extracting navigation data concerning at least a head portion of the route divided by said dividing means from said memory means storing the newest navigation information updated by said updating means;

transmitting means provided in the navigation center for transmitting from the navigation center to the moving body the navigation data extracted by said extracting means;

control means provided in the navigation center for controlling each of said memory means, said updating means, said route searching means, said dividing means, said extracting means and said transmitting means; and receiving means provided in the moving body for receiving the navigation data transmitted from said transmitting means of the navigation center, wherein said control means controls said route searching means to set a route from a current position of the moving body to the destination on the basis of the newest navigation information stored in said memory means, controls said dividing means to divide the route set by said route searching means into at least two portions, controls said extracting means to extract navigation data concerning at least a head portion of the route divided by said dividing means from said memory means storing the newest navigation information updated by said updating means, and then controls said transmitting means to transmit from the navigation center to the moving body the navigation data extracted by said extracting means, after transmitting the navigation data for the head portion to the moving body but before transmitting the navigation data for the route which is newly set by said route searching means.

12. The navigation system as claimed in claim 11, wherein the moving body transmits to the navigation center a request for the route searching to set the route from the current position of the moving body to the destination when reaching a predetermined request transmission point on the head portion for which navigation data has been received from the navigation center and along which the moving body is moving, and wherein said control means controls each of said route searching means, said dividing means, said extracting means and said transmitting means so that each means performs the respective processes, each time when the navigation center receives the request from the moving body.

13. The navigation system as claimed in claim 12, further comprising:

judging means for making at least one judgement from a group consisting of a judgement as to whether or not the predetermined request transmission point on the head portion is positioned within an area wherein communication between the moving body and the navigation center is either impossible or of poor quality and a judgement as to whether or not a part of the head portion of the route including a position where the moving body, which has reached the request transmission point, is expected to be located when transmission of the navigation data for the head portion from the navigation center is completed, is partially or completely within an area wherein communication between the moving body and the navigation center is either impossible or of poor quality; and changing means for changing the request transmission point to another point when either of said judgements is affirmative;

wherein the judgement by said judging means and the change of the request transmission point by said changing means are executed before the navigation data is transmitted to the moving body via said transmission means.

14. The navigation system as claimed in claim 13, wherein the division of the route by said dividing means is carried out by dividing the route into a plurality of segments, wherein each of the portions of the route divided by said dividing means is established using one or more of the segments as a unit.

15. The navigation system as claimed in claim 14, wherein the change of the request transmission point by said changing means is performed by increasing road length of the head portion by at least one segment.

16. The navigation system as claimed in claim 14, wherein the change of the request transmission point by said changing means is performed by decreasing road length of the head portion by at least one segment.

17. The navigation system as claimed in claim 14, wherein each segment is established so as to have the same number of bits.

18. The navigation system as claimed in claim 17, wherein the change of the request transmission point by said changing means is performed by increasing road length of the head portion by at least one segment.

19. The navigation system as claimed in claim 17, wherein the change of the request transmission point by said changing means is performed by decreasing road length of the head portion by at least one segment.

20. The navigation system as claimed in claim 14, wherein each segment is established so as to have a substantially uniform road length.

21. The navigation system as claimed in claim 20, wherein the change of the request transmission point by said changing means is performed by increasing road length of the head portion by at least one segment.

22. The navigation system as claimed in claim 20, wherein the change of the request transmission point by said changing means is performed by decreasing road length of the head portion by at least one segment.

23. The navigation system as claimed in claim 11, wherein when the navigation center detects that the moving body reaches a predetermined route search point on the head portion whose navigation data has been received from the navigation center and along which the moving body is moving, said control means controls each of said route searching means, said dividing means, said extracting means and said transmitting means so that each means performs the respective processes, whereby the moving body receives from the navigation center navigation data for a remaining portion of the route.

24. The navigation system as claimed in claim 11, wherein when traffic situation or road condition of an untraveled route of the head portion is changed while the moving body is on the route corresponding to the head portion whose navigation data has been received from the navigation center, said control means controls the route searching means to set a route from a current position of the moving body to the destination on the basis of the newest navigation information stored in said memory means, controls said dividing means to divide the route set by the route searching means into at least two portions, controls said extracting means to extract the navigation data concerning at least the head portion of the route divided by said dividing means from said memory means storing the newest navigation information updated by said updating means, and then controls said transmitting means to transmit from said transmitting means of the navigation center to the moving body the navigation data extracted by said extracting means.

25. An information communications apparatus used in a navigation system in which navigation data concerning a route from a current position of a moving body to a destination is transmitted from a navigation center including the information communications apparatus to the moving body, and then route guidance is carried out at the moving body using the navigation data received from the navigation center, the apparatus comprising:

memory means for storing navigation information which includes various information concerning routes;

updating means for updating the navigation information stored in said memory means;

route searching means for setting a route from a current position of the moving body to a destination on the basis of the newest navigation information stored in said memory means;

dividing means for dividing the route set by said route search means into at least two portions;

extracting means for extracting navigation data concerning at least a head portion of the route divided by said dividing means from the memory means storing the newest navigation information updated by said updating means;

transmitting means for transmitting the navigation data extracted by said extracting means from the navigation center to the moving body; and control means for controlling each of said memory means, said updating means, said route searching means, said dividing means, said extracting means and said transmitting means, wherein said control means controls the route searching means to set a route from a current position of the moving body to the destination on the basis of the newest navigation information stored in said memory means, controls said dividing means to divide the route set by said route search means into at least two portions, controls said extracting means to extract navigation data concerning at least a head portion of the route divided by said dividing means from the newest navigation information, and then controls said transmitting means to transmit from the navigation center to the moving body the navigation data extracted by said extracting means, after transmitting the navigation data for the head portion to the moving body but before transmitting the navigation data for the route which is newly set by said rout searching means.

* * * * *